United States Patent

[11] 3,585,485

| [72] | Inventors | Laszlo Gyugyi<br>Penn Hills;<br>John Rosa, Pittsburgh; Brian R. Pelly,<br>Murrysville, all of, Pa. |
|---|---|---|
| [21] | Appl. No. | 835,074 |
| [22] | Filed | June 20, 1969 |
| [45] | Patented | June 15, 1971 |
| [73] | Assignee | Westinghouse Electric Corporation<br>Pittsburgh, Pa. |

[54] NOVEL INTEGRAL FIRING ANGLE CONTROL FOR CONVERTERS
14 Claims, 7 Drawing Figs.

[52] U.S. Cl. .................................................. 321/7,
321/38, 321/66, 321/69 R
[51] Int. Cl. ............................................ H02m 5/14,
H02m 5/30
[50] Field of Search ........................................... 321/5, 7,
38, 40, 60, 61, 65, 66, 69

[56] References Cited
UNITED STATES PATENTS

| 3,246,231 | 4/1966 | Clarke.......................... | 321/69 |
| 3,360,709 | 12/1967 | Etter............................ | 321/5 |
| 3,431,483 | 4/1969 | Lafuze.......................... | 321/69 X |
| 3,445,742 | 5/1969 | Moscardi....................... | 321/5 X |

*Primary Examiner*—William H. Beha, Jr.
*Attorneys*—F. H. Henson, C. F. Renz and M. P. Lynch ABSTRACT: An improved method of firing angle control of thyristor type converters and particularly cycloconverters each of the component waveforms of the converter as well as the composite output waveform of the converter are summed with a reference waveform and the difference resulting from each of the summations is integrated. The firing angles of the thyristors are established when a predetermined relationship exists between the integral corresponding to the composite output waveform and the integrals corresponding to the component waveforms. A system of control is employed wherein the firing points are determined as a function of the integral of the converter output waveform.

PATENTED JUN 15 1971 3,585,485

INVENTORS
Laszlo Gyugyi, John Rosa
and Brian R. Pelly.
BY Michael P. Lynch
ATTORNEY

NOVEL INTEGRAL FIRING ANGLE CONTROL FOR CONVERTERS

CROSS-REFERENCE TO RELATED APPLICATIONS

Application Ser. No. 835,075 filed concurrently herewith, by Laszlo Gyugyi and Brian R. Pelly and assigned to the same assignee as the present invention

BACKGROUND OF THE INVENTION

1. Field of the Invention

This invention is related in general to an improved method of firing angle control of thyristor type converters and more particularly to an improved method of firing angle control in cycloconverter systems.

2. Description of the Prior Art

The cycloconverter basically consists of a pair of inversely connected converter circuits (positive and negative banks) which often is referred to as a dual converter.

The classical method of deriving the firing instant to obtain the firing angle modulation required for a sinusoidal output voltage from a cycloconverter is based on the comparison of the following two sinusoidal waveforms: the "reference waveform" exhibiting the required output frequency, and the "timing waveform" corresponding to the supply frequency. The switching instants are determined by the points at which the reference waveform intersects a series of appropriately phase shifted timing waveforms.

This method of control is relatively simple and easily realizable as long as the timing waveforms are accurately phased pure sine waves with exactly equal amplitudes. If these ideal conditions cannot be realized, as is frequently the case in practice, this method of control may produce severe distortions in the output waveform.

The rectification of these problems usually requires complex compensating and/or feedback techniques which greatly overshadow the relative simplicity of the basic method.

SUMMARY OF THE INVENTION

A new method for producing the output waveform of a cycloconverter has been devised. Instead of employing instantaneous crossing points for control, the novel method uses the average value of this cycloconverter output waveform to generate the firing pulses. This method utilizes the average value of cycloconverter waveforms rather than instantaneous values to determine firing instants and in so doing eliminates direct current and low frequency subharmonics from the output waveform and insures fast response time for reference changes. The system is insensitive to input line voltage distortions and noises.

The basic feature of this method of control is the selection of firing angles in such a fashion that between subsequent firing pulses the output voltage averaged for the time interval between pulses approximately equals the average reference voltage. Thus, the firing points are determined by the equivalence of the integrals of certain voltage waveforms rather than by the equivalence of their instantaneous value.

DESCRIPTION OF THE PREFERRED EMBODIMENTS

Figure 1:
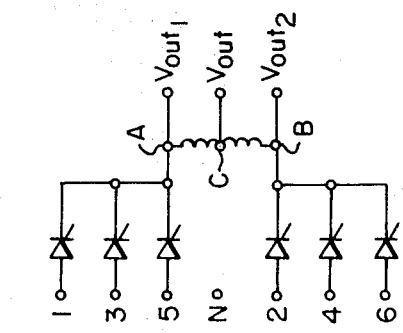
FIG. 1 is a schematic diagram of a six pulse converter used in one embodiment of the invention.

In FIG. 1 a simplified schematic of a six pulse converter including an interphase transformer 12 is shown which represents one cycloconverter arrangement. The pulse number is equal to the number of identical intervals of operation occurring during each input cycle The basic converter unit is the three pulse converter which is represented schematically in FIG. 1 by the arrangement of thyristors 1, 3 and 5. This basic unit can be utilized to design a six pulse converter as illustrated in FIG. 1 by employing two such units or can be expanded to develop nine pulse converters, 12 pulse converters, etc. merely by employing additional basic three pulse units. Furthermore the interconnection of the basic units may be in serial form as illustrated in FIG. 1 or in a parallel arrangement commonly referred to as a bridge circuit.

This fundamental discussion of converter circuits is included to emphasize the fact that the specific embodiment of the invention which is to follow is by way of example only and that the principles disclosed are applicable to converter circuits in general.

Referring to FIG. 1, the output voltage waveform $V_{out}$ is the mean of the waveforms $V_{out\,1}$ and $V_{out\,2}$ produced by the two three pulse converters at each end of the transformer 12 with respect to the system neutral N. Sequential firing of the thyristor-type switches 1—6 produces the output waveforms of the respective three pulse converters.

Figure 2:
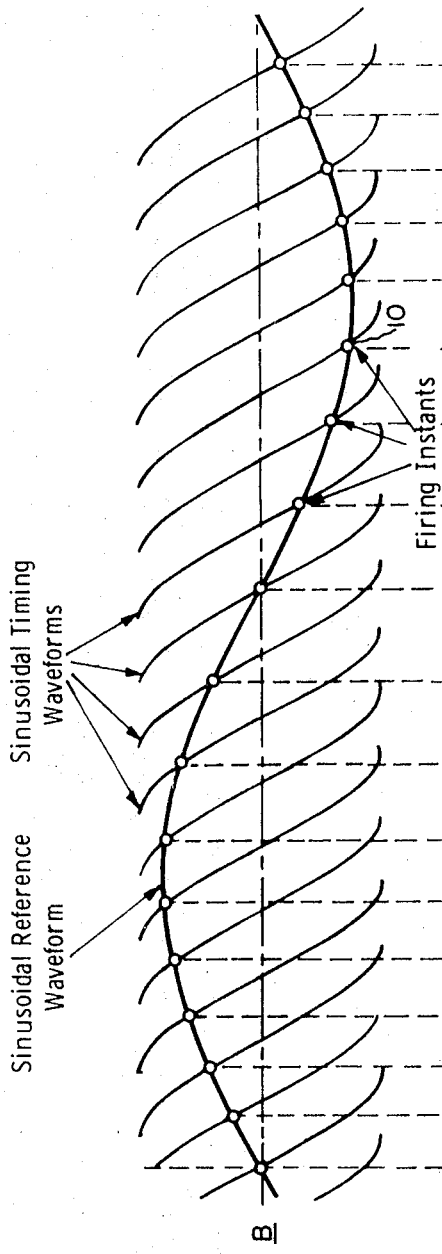
FIGS. 2, 3, 4 are graphical representations of cycloconverter output waveforms.

The waveforms illustrated in FIG. 2A depict the desired cyclic output voltage waveform $V_{out}$ of the cycloconverter and the wanted component of the output waveform. Illustrated in FIG. 2B is the classical method of deriving the firing pulses to sequentially activate the thyristor switching devices 1—6 of the cycloconverter circuit. A reference voltage waveform $V_{REF}$ corresponding to the wanted component of the output waveform of FIG. 2A is compared to timing waveforms corresponding to the input voltage of the cycloconverter. The firing instant required to produce the desired output waveform $V_{out}$ coincide with the points 10 at which the reference voltage waveform $V_{REF}$ intersects the timing waveforms.

If as noted above the timing waveforms are not pure sine waves, which may be the result of a noisy or distorted input voltage, the desired waveform $V_{out}$ will not be realized but rather a distorted output waveform will be produced. The inherent sensitivity of the intersecting waveform technique for developing desired cycloconverter output waveforms to noise and distortion results from the utilization of instantaneous supply voltage values to determine the firing instants of the thyristor circuits 1—6.

Figure 3:
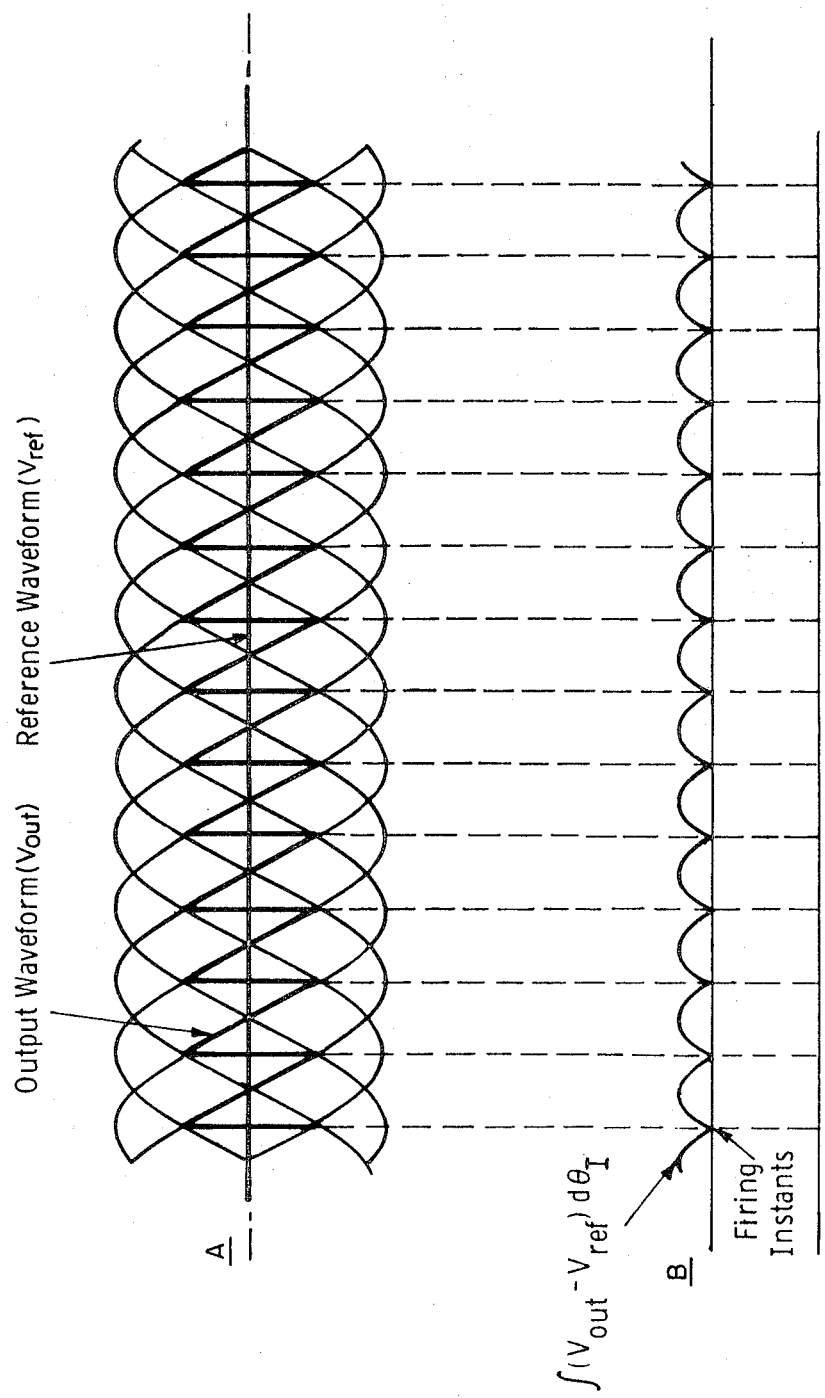

It has been determined by mathematical analysis and confirmed by experimentation that a cycloconverter output waveform generating technique based on the integral voltage values of the cycloconverter waveforms in contrast to the instantaneous voltages produces the desirable output waveforms without exhibiting sensitivity to supply voltage noise and distortion. The basic integral method of establishing firing points similar to those obtained by the instantaneous voltage value method under ideal waveform conditions can be represented mathematically as:

$$\int_0^{\theta_1} (V_{out(\theta_0)} - V_{ref(\theta_0)}) d\theta_1$$

where $\theta_o = \omega_{out} t = 2\pi f_{out} t$ $\theta_i = \omega_{in} t 2\pi f_{in} t$ $f_{in}$ = input frequency to the cycloconverter $f_{out}$ = output frequency obtained from the cycloconverter, and $t$ = time Consider a cycloconverter output waveform $V_{out}$ as shown in FIG. 3A wherein the wanted component of this waveform is proportional to the reference waveform $V_{REF}$. Assuming for the purpose of illustration that the reference voltage is zero, then the output waveform shown in FIG. 2A is obtained. The integral of the output waveform of FIG. 3A (shaded areas) is illustrated in FIG. 3B. The integral of the waveform becomes precisely zero at each firing instant indicating that the derived integral control method may be applied to determine firing instants in the cycloconverter systems.

Based on the results obtained by the integral control methods for determining firing instants with a DC reference waveform it was concluded that succeeding firing instants could be obtained by detecting the precise zero values of the integral of the output voltage waveform.

The extension of the integral control method to cycloconverter systems utilizing AC reference waveforms did not however provide the desired output voltage waveform $V_{out}$ anticipated.

While the results obtained with the DC reference waveform appeared to indicate that in a system utilizing an AC reference waveform that the "ripple" obtained by subtracting the AC reference waveform from the output waveform would also assume zero values at the firing instants, analysis of such a system proved otherwise. Evaluation of these integrals for an AC reference shows that with increasing reference amplitude the integral values between two succeeding firing instants increasingly deviates from a precise zero. The integral values are dependent on the relative position of the integration interval and the reference waveform, i.e. on the portion of the output voltage ripple being integrated. Thus the simple integration method defined mathematically above and illustrated to be valid in a cycloconverter system utilizing a DC reference waveform is not directly applicable in the conventional cycloconverter system utilizing an AC reference waveform to produce the desired cycloconverter output waveform.

Figure 4:
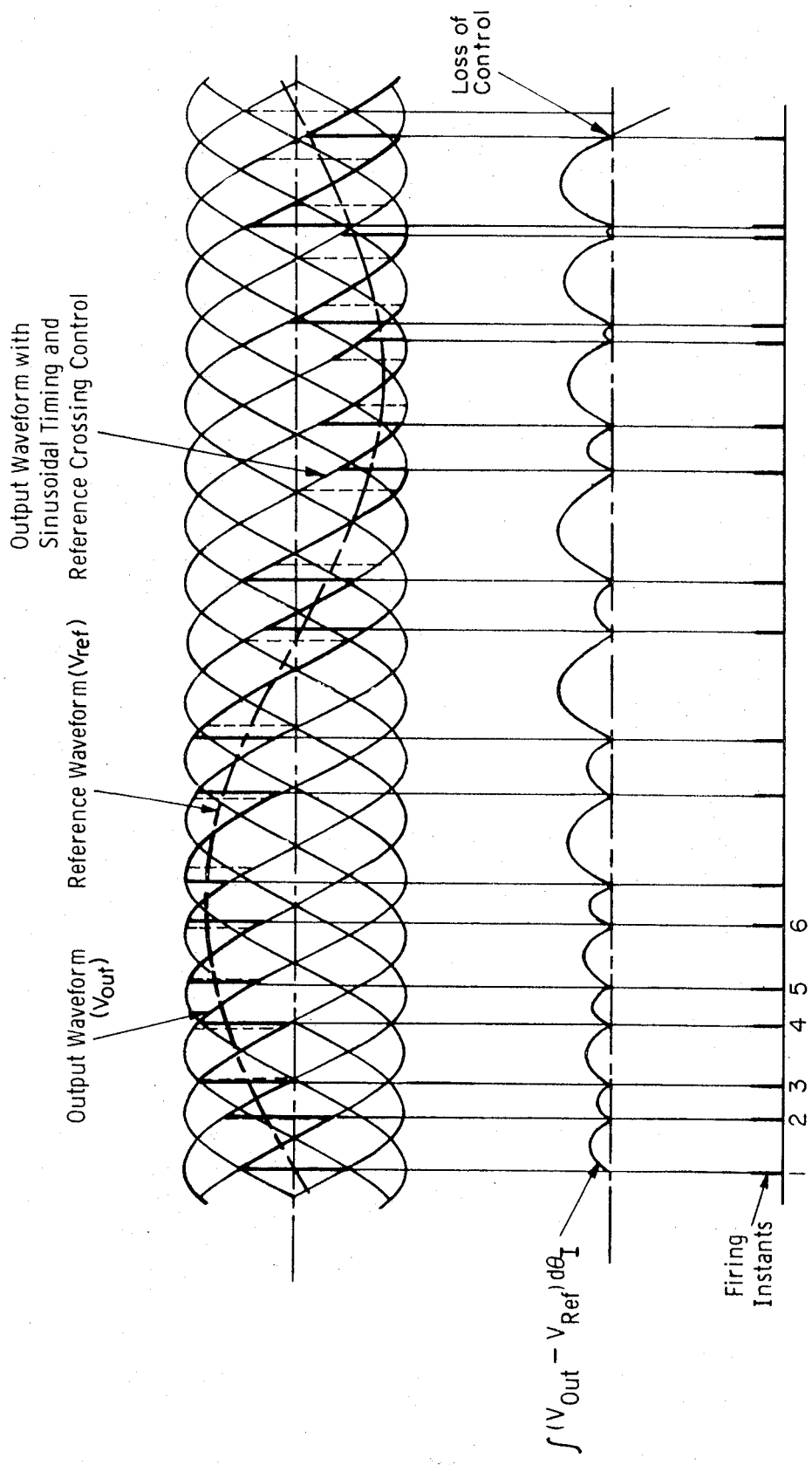

FIG. 4 illustrates the undesirable results obtained when the basic integral control method for determining firing instants is applied to a system utilizing a sinusoidal reference waveform $V_{REF}$. The basic integral control method forces the integral of the ripple to be equal to zero and as a result the firing instants become shifted from the firing instants determined by the intersecting sine wave technique (illustrated by dotted lines) so that harmonics in the output waveform increase considerably. Furthermore this shift of firing instants can become a continuous drift indicated by the reduced spacing between successive firing instants. The firing instants alternate between a firing instant for a thyristor in the group 1, 3, 5 and a firing instant for a thyristor in the group 2, 4, 6. This continuous drift produces a deteriorating output waveform indicated by the nonuniform waveform steps in FIG. 4 and eventually results in loss of control when the odd and even firing instants coincide at point L.

Further evaluation of the deteriorating output waveform $V_{out}$ of the cycloconverter utilizing a sinusoidal reference waveform indicates that a DC component appears in the output waveforms of the two three-pulse converter waveforms. $V_{out\ 1}$ and $V_{out\ 2}$.

Figure 5:
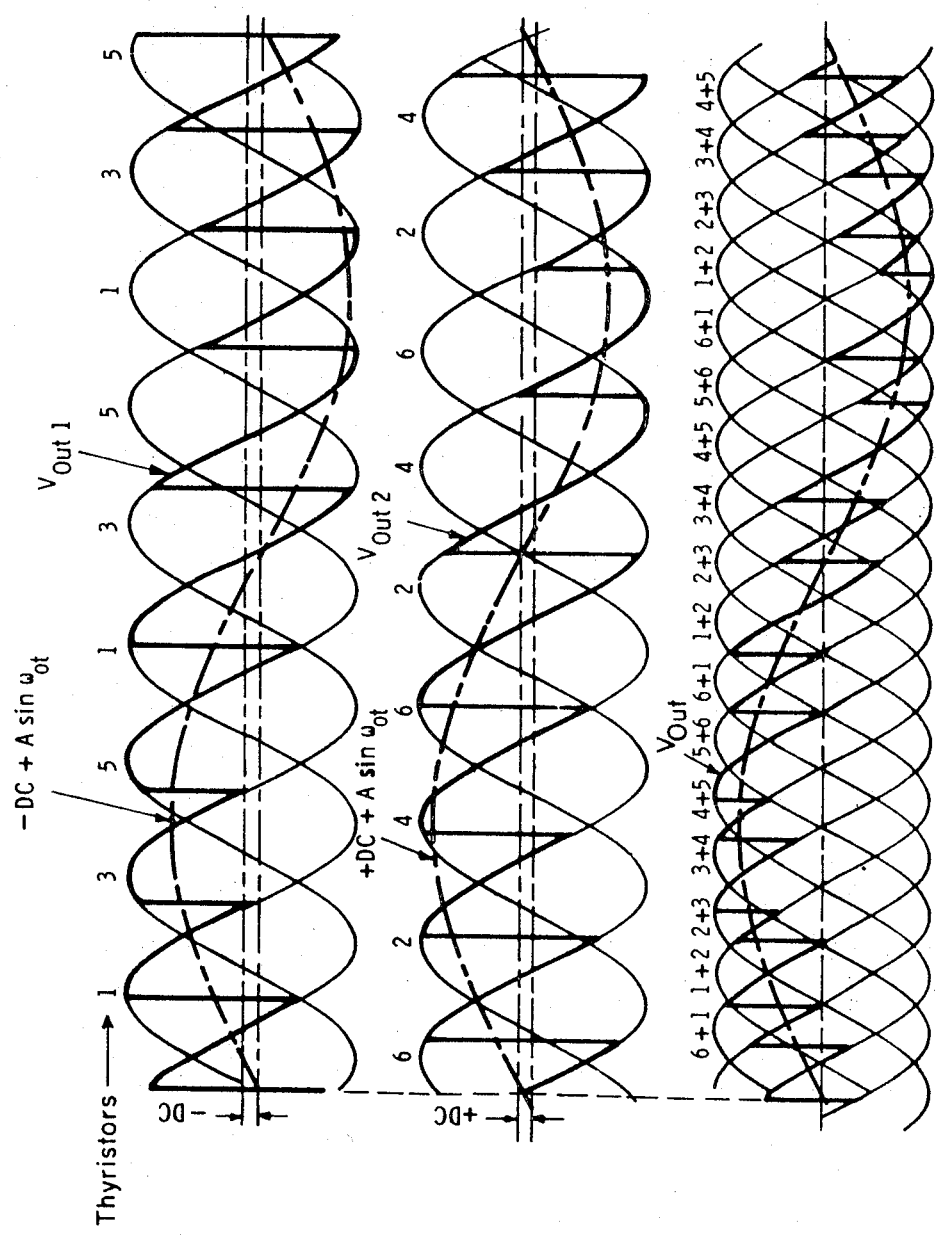
FIGS. 5, 6 are graphical representations of waveforms obtained from circuits of the type of FIG. 1.

The effect of the presence of the DC component in the output waveforms $V_{out\ 1}$ and $V_{out\ 2}$ is illustrated graphically in FIG. 5 by superimposing a DC component on the sinusoidal reference waveform supplied to the two three-pulse converters and graphically reconstructing the cycloconverter output waveform $V_{out}$ from the waveforms $V_{out\ 1}$ and $V_{out\ 2}$. The output waveform thus produced duplicates substantially the deteriorating waveform illustrated in FIG. 4 as produced by the basic integral control method.

Figure 6:
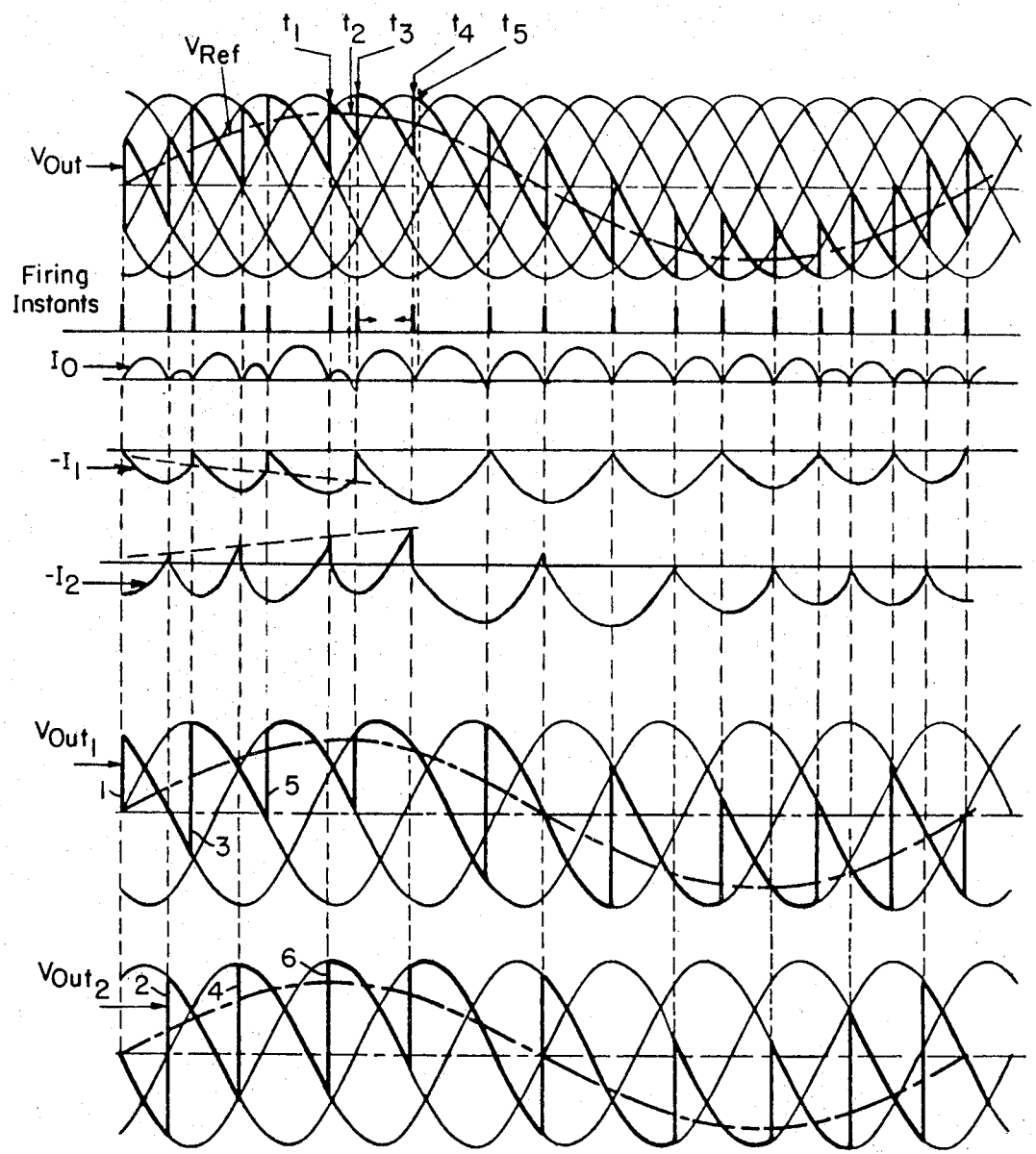

Referring to FIG. 6 there is illustrated the output waveforms of the two three-pulse converters, $V_{out\ 1}$ and $V_{out\ 2}$ cycloconverter output waveform $V_{out}$ and the ripple integrals of these waveforms $I_1$, $I_2$ and $I_0$ respectively. The waveforms $I_0$, $I_1$ and $I_2$ are the integrals of the respective output voltage waveforms $V_{out}$, $V_{out\ 1}$ and $V_{out\ 2}$ minus the reference waveform. As was illustrated in FIG. 4 the basic ripple integral control method of determining firing instants has the effect of progressively delaying the firing points to pulse wave converter and advancing them to the other pulse converter. As illustrated in waveforms $I_1$ and $I_2$ of FIG. 6, the shifting effect of firing instance generates an opposite polarity progressively increasing DC signal (shown in dotted lines) at the output of the half wave converters. Therefore the integrals of the ripple voltages of the half wave converter between two succeeding firing instants indicates the amount of DC content and hence the continuous drift of the firing instants. The firing instants prior to point $t1$ of the $V_{out}$ waveform of FIG. 6 are determined by the basic ripple integral control method. i.e a new firing instant is assumed when the integral of the main ripple voltage $I_0$ becomes zero. The deteriorating condition of the $V_{out}$ waveform prior to point $t1$ corresponds to the progressively increasing DC components of the ripple integrals of the half wave converter waveforms $I_1$ and $I_2$. Therefore the drift of the firing instants of the ripple integral control method can be measured as a function of the DC content of the output waveforms of the half wave converters. This relationship permits the utilization of the DC content of the three pulse converters to compensate for firing instant drift.

A signal proportional to the DC component present in the waveforms $V_{out\ 1}$ and $V_{out\ 2}$ can be obtained by integrating the ripple voltages of the three pulse converters. The ripple voltages are obtained by subtracting the reference voltage from the output voltage, i.e., $V_{out\ 1} - V_{out\ ref}$ and $V_{out\ 2} - V_{out\ 2} - V_{out\ ref}$.

The effect of compensating for firing instant drift produced by the basic integral control method by utilizing the ripple integrals is illustrated in the $V_{out}$ waveform of FIG. 6 as starting at point $t_1$. Whereas the firing instants prior to point $t_1$ were determined by the basic ripple integral control method, the subsequent firing instants are not determined by the zero integral of the main ripple waveform $I_0$. A new firing instant is defined when the integral of the ripple of the full wave $I_0$ become equals to a prescribed fraction of the integral of the ripple voltage of the appropriate three pulse converter waveform $I_1$ or $I_2$. Thus the firing instant which would appear at point $t_2$ is delayed to point $t_3$ by using integral $I_1$ for compensation and the following firing instant which would appear at point $t_5$ is advanced to point $t_4$ by using integral $I_2$ as compensation. Since the compensation is proportional to the error the system can settle into a stable state.

If a firing point $\alpha_1$ is expressed in radians from an arbitrary zero point, then a new firing point $\alpha_{(i+n)}$ is assumed when the following conditions are satisfied.

(1) For $\alpha(2i+1)$:

(1)
$$i=1, 2, 3 \ldots \int_0^{\theta_1}[V_{out}(\theta_0) - V_{ref}(\theta_0)]d\theta_I$$
$$= -K\int_{\alpha(2i+1)}^{\theta_1}[V_{out\ 1}(\theta_0) - V_{ref}(\theta_0)]_I\theta d$$

(2) For $\alpha_{2i}$:

(2)
$$i=1, 2, 3 \ldots \int_0^{\theta_1}[V_{out}(\theta_0)][V_{ref}(\theta_0)]d\theta_I$$
$$= -K\int_{\alpha(2i-2)}^{\theta_1}[V_{out\ 2}(\theta_0) - V_{ref}(\theta_0)]_I\theta d]$$

where:
$\theta_o = \omega_{out}t = 2\pi f_{out}t$
$\theta_i = \omega_{in}5 = 2\pi f_{in}t$
$f_{in}$ = input frequency to the cycloconverter
$f_{out}$ = output frequency obtained from the cycloconverter.
$t$ = time; and
$K$ is a positive constant ($0<K1$)

Integral equation (1) is satisfied at $\theta_i = \alpha_{(2\ i+1)}$ and equation (2) is satisfied at $\theta_i = \alpha_{2i}$. Thus the successive solution of the above equations gives the successive firing points.

The value of $K$ determines the fraction of the ripple integral employed for compensation. The constant is typically between 0.05 and 0.1.

While the negative rippled integral of the three pulse converter waveforms $I_1$ and $I_2$ is illustrated in FIG. 6 and represented by the minus $K$ factor of the mathematical equations, it is also practical to utilize the positive rippled integral for firing instant compensation. The positive integral cannot be applied to instantaneously adjust the firing instants but rather must be delayed for one firing interval. Utilization of the positive integral therefore necessitates the use of a storage device to store the correction factor for one firing interval before applying it to determined the subsequent firing instant. Utilizing the positive ripple integral, the output waveforms of the cycloconverter, shown in in FIG. 6 as $V_{out}$, $V_{out\,1}$ and $V_{out\,2}$, are integrated between succeeding firing points. Thus, $V_{out}$ is integrated between each firing point, $V_{out\,1}$ is integrated between subsequent odd, and $V_{out\,2}$ is integrated between subsequent even firing points. A new odd firing point is assumed when the integral of $(V_{out}-V_{REF})$ equals to a prescribed fraction of the integral of $(V_{out\,2}-V_{REF})$. A new even firing point is assumed when the integral of $(V_{out}-V_{REF})$ equals to a prescribed fraction of the integral of $(V_{out\,1}-V_{REF})$. It may be noted, therefore, that to determine a new odd firing point $\alpha_{(2i-1)}$ a correction term which was derived during a previous "even conduction interval" $\alpha_{(2i-2)}$ to $\alpha_{2i}$ is used. Similarly, to determine a new even firing point, $\alpha_{(2i-2)}$, a correction term derived during the previous "odd conduction interval" $\alpha_{(2i-1)}$ to $\alpha_{(2i-1)}$ is used. This method, thus, requires a storage of the correction term during a firing interval.

While the discussions and illustrations have been concerned with rippled waveforms obtained by subtracting $V_{out\,1,2}-V_{REF}$ which do not include an AC component of the wanted output frequency, it has been verified that the integral firing instant control method is likewise valid if the ripple waveforms are obtained by subtracting $V_{out\,1,2}-a\,V_{REF}$ $(0<a<1)$. The latter method of deriving ripple waveforms results in a ripple waveform superimposed on an AC component of the wanted output frequency.

Figure 7:
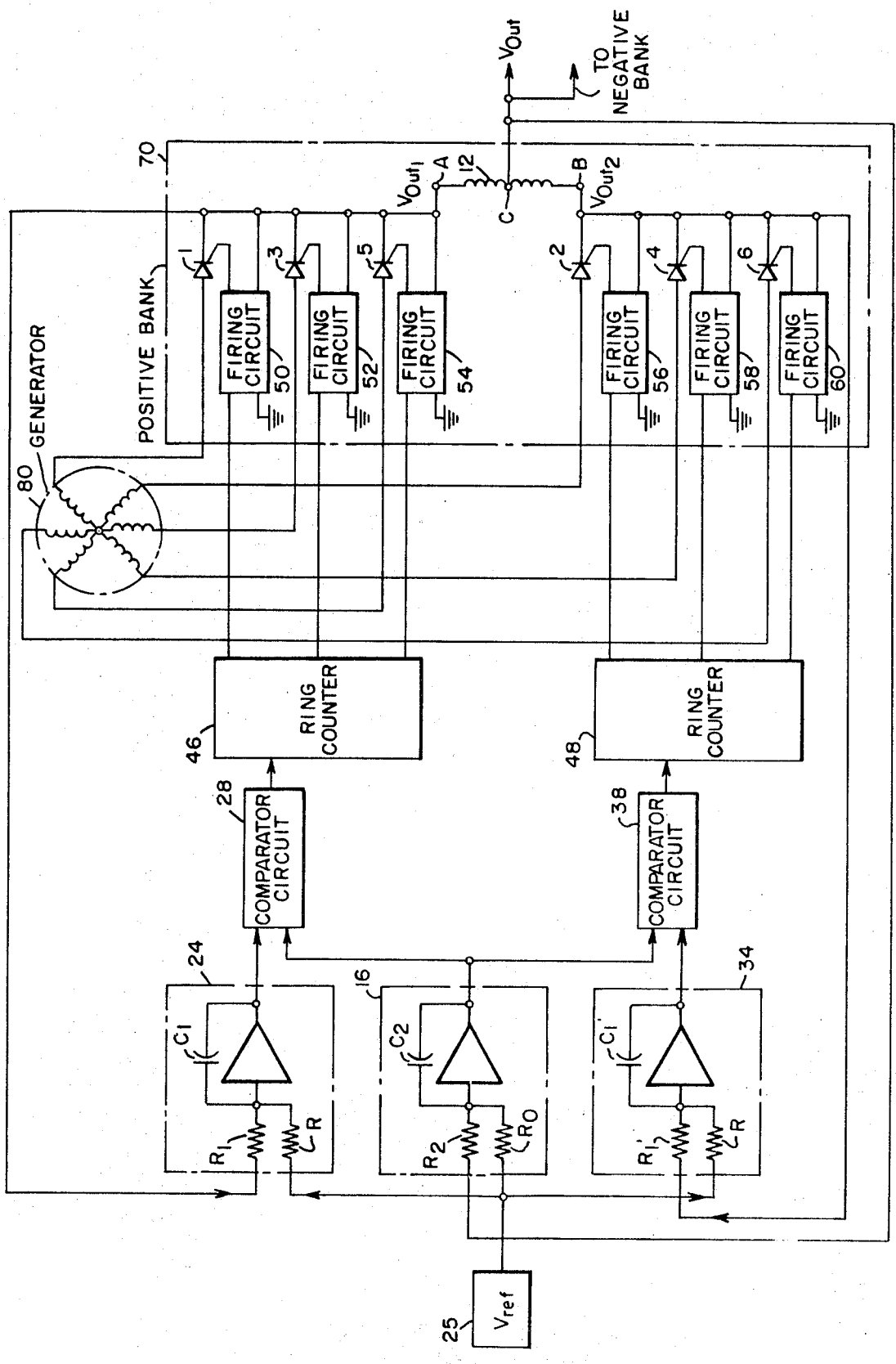
FIG. 7 is a schematic block diagram of a preferred embodiment of the invention.

A schematic diagram of an embodiment of the compensated integral control method in the form heretofore described, for determining firing instants of a particular cycloconverter system is illustrated in FIG. 7.

One bank 70 for example the positive bank, of a dual converter system is illustrated schematically in FIG. 7 as consisting of two three pulse converters comprised of thyristors 1, 3, 5 and 2, 4, 6 respectively. This represents half of a dual converter, the other half being a negative bank (not shown). It is assumed that the converter is operated in a circulating current mode wherein the current is permitted to circulate from the positive bank through the negative bank back to the generator 80. The three pulse converters are effectively half wave converters, one half wave converter being controlled by one three stage ring counter 46 and the other half wave converter being controlled by another three stage ring counter 48. The output potentials of the three pulse converters are joined together through the interphase transformer 12 to produce the final output at the center tap point C thereof.

In the operation of the integral control of one bank of a cycloconverter in accordance with our invention, the voltage present at point A is fed to the summing point of a operational amplifier 24, and the voltage at point B is fed to the summing point of an operational amplifier 34. The arithmetic mean of these two voltages, obtained at the output point C is fed to operational amplifier 16. The operational amplifier 16, 24 and 34 are connected to operate as integrators. A predetermined reference voltage 25, which is generally a high quality sine wave which is to be amplified by the cycloconverter, is applied to each of the operational amplifiers 16, 24 and 34 to be mathematically combined with the output potentials of the system obtained from points A, B and C. The polarity of the reference voltage with respect to the output voltages of the cycloconverter is such that at the summing point of the integrators 16, 24 and 34 the differences of these voltages appear. The outputs of the integrators 16 and 24 are fed to the comparator circuit 28, and the outputs of the integrators 16 and 34 are fed to the comparator 38. Thus, when the output of amplifier 24 becomes equal to the output of amplifier 16, comparator circuit 28 produces an output pulse which sets ring counter 46 to its next state. Similarly, when the outputs of amplifiers 34 and 16 become equal, comparator circuit 38 produces a pulse which sets ring counter 48 into its next state. The three outputs of the ring counters 46 and 48, respectively, are fed to two sets of firing circuits 50, 52 and 54 and 56, 58 and 60, which provide the gating signals to the cycloconverter thyristors 1, 3, 5 and 2, 4, 6 respectively. Thus for example, the ON states of the stages of the ring counter 46 correspond to the conduction intervals of the thyristors 1, 3, 5 and the ON states of the ring counter 48 correspond to the conduction intervals of the thyristors 2, 4 and 6. By setting one of the ring counters 46 and 48 into a new state, the next output voltage of the cycloconverter is provided to its output terminals A, B and C which are again fed to the appropriate integrators. Thus, at points A and B, the voltage waveforms are typical three pulse cycloconverter waveforms and at point C typical six pulse cycloconverter waveforms.

The basic concept of the new method of control is that the firing angles are selected in such a fashion that between subsequent gate pulses to the thyristors 1—6 the output voltage averaged for the time interval between pulses is approximately, not precisely, equal to the average reference voltage. Thus, the firing points are determined by the equivalence of the integrals of certain voltage waveforms rather than by the equivalence of instantaneous value.

The introduction of the "$K$" factor which establishes the "approximate" equality between the out put of amplifier 16 and amplifiers 24 and 34 to increment the ring counters 46 and 48 can be electrically provided by effectively alternating the amplifier 16 signal with respect to the signals of amplifiers 24 and 34. As shown schematically in FIG. 7 the values of amplifier components $R_1$ and $C_1$ of amplifier 24 and $R_1'$ and $C_1'$ of amplifier 34 can be determined with respect to the values of $R_2$ and $C_2$ of amplifier 16 so as to establish the output signal relationship between amplifier 24 and 34, and amplifier 16 which will account for the desired "$K$" factor. Other method of providing the desired relationship between the outputs of amplifiers 24 and 34 and the output of amplifier 16 include alternating the reference waveform input to each amplifier by varying the value of resistor $R_0$ with respect to resistor $R_1$ and and alternating the amplifier output signals prior to the comparator circuits 46 and 48.

The apparatus of FIG. 7 which depicts one embodiment of the control method operates on the output waveforms of the cycloconverter shown in FIG. 6 as C, A and B, to integrate between succeeding firing points. Thus, C is integrated between each firing point, A is integrated between subsequent odd firing points, and B is integrated between subsequent even firing points. A new odd firing point is assumed when the integral of C is equal to a prescribed fraction of the integral of A, and a new even firing point is assumed when the integral of C equals to a prescribed fraction of the integral of B. The above described embodiment of the integral control method for defining cycloconverter firing instants has depicted a specific scheme for utilizing the integral of the output waveform $V_{out}$ which is tailored to the six pulse converter of FIG. 1. Each application of the integral control method to various converter systems would dictate a specific embodiment.

The invention therefore is not limited by the specific embodiment disclosed but rather extends to the utilization of the integral of the converter output waveform to define converter firing instants which result in substantially distortion-free, repetitive converter output waveforms.

While the present invention has been described when the certain degree of particularity it should be understood that various modifications and changes thereof can be made within the spirit and scope of this invention.

We claim as our invention:

1. A method for generating an output waveform of a converter circuit including an essentially sinusoidal AC input voltage source, a reference voltage source, and switching means operated by firing pulses to generate numerous component waveforms, a composite of which forms the converter output waveform, comprising the steps, of, firstly summing the component waveforms and the reference voltage waveform to generate signals corresponding to the differences between said component waveforms and said reference waveform, secondly summing the converter input waveform and said reference waveform to generate a signal corresponding to the difference between said converter output waveform and said reference waveform, determining the average value of said signals corresponding to said differences, comparing the average value of the signals corresponding to the first sunning step to the average value of the signal corresponding to the second summing step, and generating firing pulses when predetermined relationships exist between said average values.

2. A method as claimed in claim 1 wherein said average values are obtained by integration.

3. A method as claimed in claim 1 wherein the average value of the converter output waveform is determinded between successive firing pulses.

4. A converter circuit including an essentially sinusoidal AC input voltage source, a reference voltage source switching means operated by firing pulses to generate numerous component waveforms, a composite of which forms the converter output waveform, first means for summing the component waveforms and the reference waveform to generate signals corresponding to the differences between said component waveforms and said reference waveform, second means for summing the converter output waveform and said reference waveform to generate signal corresponding to the difference between said converter output waveform and said reference waveform, third means for when said determining the average value of said signals corresponding to said differences, and fourth means for comparing the average value of the signals corresponding to the first means to the average value of the signal corresponding to the second means and generating firing pulses when predetermined relationships exist between said average values.

5. A converter circuit as claimed in claim 4 wherein said third means for determining the average value of said differences are integrator circuits.

6. A converter circuit as claimed in claim 4 wherein said fourth means includes a comparator circuit.

7. A converter circuit as claimed in claim 4 wherein said fourth means includes a firing pulse generator.

8. A converter circuit wherein the phase, frequency and amplitude of the output is controlled as a function of a reference waveform, comprising, switching means responsive to a control signal for controlling the output waveform of said converter, means operatively coupled to a source of said reference waveform and to said switching mean for summing said reference waveform with the converter output waveform, an integrator circuit means having an input coupled to the output of said summing means for generating said control signal when a predetermined relationship exits between the average value of the reference waveform and the average value of the converter output waveform, and means for controlling said switching means in response to said control signal, said switching means comprised of multiple sets of switching elements.

9. A converter circuit as claimed in claim 8 wherein the output waveform of said converter is connected additively with the output waveform of said reference source successively through an integrator circuit, a comparator circuit and the control means associated with said switching means.

10. A converter circuit as claimed in claim 8 wherein said converter output waveform is comprised of a plurality of component waveforms, wherein said component waveforms correspond to the output of said multiple sets of switching elements.

11. A converter circuit as claimed in claim 9 wherein said control means comprises a plurality of control elements, the output to one of said control elements connected to control one set of said switching elements to control the activation of the switching elements of said set.

12. A converter circuit as claimed in claim 11 wherein each set of said switching elements comprises a plurality of controlled rectifier elements.

13. A converter circuit as claimed in claim 12 wherein each of said control elements is a ring counter circuit and the outputs of said ring counter circuits are connected to a set of rectifier elements through individual firing circuits associated with each of said controlled rectifiers.

14. A converter circuit as claimed in claim 12 including summing circuit means for combining said reference waveform with said converter output waveform and with each of said component waveforms, and generating output signals corresponding to the difference between said reference waveform and said converter output waveform a well as generating output signals corresponding to the difference between said reference waveform and each to said component waveforms, said integrator circuit means being operatively connected to the outputs of said summing circuit means for generating output signals corresponding to the average value of the output signals of said summing circuit means, and including comparator circuit means responsive to said average value output signals for generating control signals to each of said sets of switching elements when a predetermined relationship exists between the average value corresponding to the converter output waveform and the average values corresponding to the respectively component waveforms.